(12) United States Patent
Luo et al.

(10) Patent No.: US 9,008,652 B2
(45) Date of Patent: Apr. 14, 2015

(54) METHOD AND SYSTEM INTEGRATING GEOGRAPHICAL LOCATION INFORMATION AND BLUETOOTH TECHNOLOGY FOR RELAYING ELECTRONIC BUSINESS CARD

(75) Inventors: Xiping Luo, Shanghai (CN); Qingshan Chen, Shanghai (CN); Lixin Zhen, Shanghai (CN); Teng Long, Shanghai (CN); Lu Cao, Shanghai (CN)

(73) Assignee: Intsig Information Co., Ltd., Shanghai (CN)

( * ) Notice: Subject to any disclaimer, the term of this patent is extended or adjusted under 35 U.S.C. 154(b) by 6 days.

(21) Appl. No.: 14/126,379

(22) PCT Filed: Nov. 21, 2011

(86) PCT No.: PCT/CN2011/082534
§ 371 (c)(1),
(2), (4) Date: Dec. 13, 2013

(87) PCT Pub. No.: WO2013/016909
PCT Pub. Date: Feb. 7, 2013

(65) Prior Publication Data
US 2014/0120906 A1    May 1, 2014

(30) Foreign Application Priority Data
Jul. 29, 2011    (CN) .......................... 2011 1 0214509

(51) Int. Cl.
| H04W 4/00 | (2009.01) |
| H04M 1/725 | (2006.01) |
| H04W 4/02 | (2009.01) |
| G06Q 10/10 | (2012.01) |
| H04L 29/08 | (2006.01) |

(52) U.S. Cl.
CPC ............ *H04W 4/008* (2013.01); *H04M 1/7253* (2013.01); *H04W 4/02* (2013.01); *G06Q 10/10* (2013.01); *H04W 4/023* (2013.01); *H04L 67/18* (2013.01)

(58) Field of Classification Search
USPC ................. 455/466, 414.1–414.2, 41.1–41.2, 455/456.1, 456.2, 457
See application file for complete search history.

(56) References Cited

U.S. PATENT DOCUMENTS

| 6,816,725 | B1 * | 11/2004 | Lemke et al. ............... 455/414.1 |
| 2008/0134030 | A1 * | 6/2008 | Kansal et al. ................. 715/700 |
| 2008/0194203 | A1 * | 8/2008 | Hong ............................ 455/41.2 |
| 2010/0255861 | A1 * | 10/2010 | Raviv et al. ................... 455/466 |

\* cited by examiner

*Primary Examiner* — Wayne Cai
(74) *Attorney, Agent, or Firm* — Novick, Kim & Lee, PLLC; Allen Xue

(57) ABSTRACT

Provided in the present invention are method and system for delivering an electronic business card by combining geographical location information and Bluetooth technology. The method comprises: a requesting user submitting the current geographical location information, the name of a Bluetooth communication device, and a list of the names of other detected Bluetooth communication devices to an electronic business card delivery server by using a mobile client, acquiring a list of users corresponding to neighboring mobile clients as well as the user's condensed identity information, the neighboring mobile clients being located within a predetermined distance range and located within a detection range of the Bluetooth communication device; selecting a user from the user list, sending an electronic business card delivery request to the electronic business card delivery server; the electronic business card delivery server transmitting the request to the mobile client corresponding to the selected user, and when receiving corresponding confirmation information, responding to the request so as to deliver the electronic business card. Compared with the prior art, the present invention allows for the delivery of large quantity of electronic business cards, simplified operations, and ensured accuracy and security of electronic business card contents.

11 Claims, 6 Drawing Sheets

METHOD AND SYSTEM INTEGRATING GEOGRAPHICAL LOCATION INFORMATION AND BLUETOOTH TECHNOLOGY FOR RELAYING ELECTRONIC BUSINESS CARD

FIELD OF THE INVENTION

This invention relates to a technical field of information processing and that of information exchanging, and especially to a method for delivering an electronic business card by combining geographical location information and Bluetooth technology as well as a delivering system for realizing such delivering method.

DESCRIPTION OF THE RELATED ART

Business card is a medium that people usually use to carry and deliver contact information. A lot of business cards are exchanged in daily business activities, and people communicate contact information by exchanging business cards, so as to establish communication with others.

Nowadays, business cards exchanged by most people are printed papery business cards. The problem brought by the conventional way of exchanging papery business cards is that when a papery business card is received from someone else, business card information (mainly including contact information such as name, profession, job title, company name, telephone number and E-mail, additionally, may also include some company information such as company name, company address and business field of the company) usually need to be electronized by manual input, so that the business card information can be stored into the address book of computers or mobile terminals. Additionally, when contact information need to be provided during remote communication (for example, telephone) or face-to-face communication (non-papery business card), in order to record the information data of a contact (such as telephone number, cellphone number, e-mail, address, company name, and so on), a notebook is often needed to record those information data, or those information data need to be manually inputted into the address book of computers or mobile terminals. Thus, operations for inputting information data are inconvenient; the accuracy of inputted information data is not guaranteed; and the information data is often incomplete and has errors.

Some existing mobile terminals provided with camera (cellphone, PDA, tablet computer or laptop and the like) have the function of scanning business cards, by directly taking a picture of the business card only by using the micro distance photography pattern of the camera, uses the principles of image processing and optical character recognition (OCR, Optical Character Recognition) to automatically process and recognize the business card image being taken, and then automatically extracts some information such as name, telephone number, E-mail and so on therefrom so as to add such information into the address book, thus bringing great convenience for those people who want to input the contact information recorded in the business card into the electronic device. However, even so, characters recognized by OCR can't be 100% accurate, which means that the user has to check and correct them manually. Thus, it is troublesome, and it is no better than direct delivery and exchange of electronic business cards. Additionally, in the above application situations, the problem of how to input the data after the printed papery business cards are exchanged can only be partially solved, while the problem of how to input the data in case of remote communication or when there is no business card are still unsolved.

On the other hand, the electronic business card is emerging, and some mobile terminals are provided with functions of editing and exchanging business cards. If the function of exchanging electronic business cards is to be realized, unilateral delivery or mutual exchange can be performed by means of a communication network. The electronic business card can be transmitted via SMS (short messaging system), data transmission, e-mail, and so on.

Existing mobile terminal in the market normally support GPS positioning and Bluetooth technology. The accuracy of GPS positioning has a certain error range. The error range of a commercial GPS positioning system is usually within 20 m when it can directly connect to a GPS satellite outdoors, however the accuracy of the GPS positioning would significantly reduce indoors, where the error may be several hundred meters. Meanwhile, the communication distance of the Bluetooth technology is about 8 m to 30 m, if two or more users located within the detection range of their own Bluetooth communication devices want to deliver data through the Bluetooth technology, those users need to firstly agree on a password, establish connection by inputting the same password, and then transmit data by using Bluetooth connection; such operations are inconvenient.

SUMMARY OF THE INVENTION

An object of the invention is to provide a method and system for delivering an electronic business card by combining geographical location information and Bluetooth technology, for solving problems in the prior art that it is difficult to deliver the business card and the operation of extracting business card information is inconvenient and is prone to problems.

One aspect of the invention provides a method for delivering an electronic business card by combining geographical location information and Bluetooth technology, characterized in that, the method comprises: a requesting user, by using a mobile client, submits the present geographical location information, the name of the mounted Bluetooth communication device, and a list of names of all the other Bluetooth communication devices detected by the Bluetooth communication device to an electronic business card delivery server which has established a communication link with the mobile client, acquires from the electronic business card delivery server a list of users corresponding to neighboring mobile clients located within a predetermined distance range and located within a detection range of the Bluetooth communication device, and displays the condensed identity information of the users in the user list on the mobile client corresponding to the requesting user; the requesting user selects one or more users from the user list displayed by the mobile client, as the object users of the delivery of the electronic business card, issues an electronic business card delivery request for delivering the electronic business card to the object users and/or for acquiring the electronic business card from the object users, and transmits the electronic business card delivery request to the electronic business card delivery server; the electronic business card delivery server transmits the electronic business card delivery request to the mobile client corresponding to the selected user, and upon receiving a confirmation information transmitted from the mobile clients corresponding to the object users, responds to the electronic business card delivery request so as to deliver the electronic business card of the requesting user to the mobile client corresponding to the object user and/or deliver the electronic business card of the object user to the mobile client corresponding to the requesting user.

Optionally, the condensed identity information is transmitted to the electronic business card delivery server together with the geographical location information, or the condensed identity information is prestored in the electronic business card delivery server.

Optionally, steps of acquiring from the electronic business card delivery server the list of users corresponding to the neighboring mobile clients located within the predetermined distance range and located within the detection range of the Bluetooth communication device, and displaying the condensed identity information of the users in the user list of the mobile client corresponding to the requesting user comprises: the electronic business card delivery server receives the geographical location information transmitted from the mobile clients corresponding to respective users; with respect to the requesting user, the electronic business card delivery server provides the requesting user with the list of users corresponding to the neighboring mobile clients located in the predetermined distance range, and displays the condensed identity information of the users in the user list of the mobile client corresponding to the requesting user; the electronic business card delivery server receives a list of names of the mounted Bluetooth communication devices transmitted from the mobile clients corresponding to respective users, and names of all the other Bluetooth communication devices detected by the Bluetooth communication device; with respect to the requesting user, the electronic business card delivery server filters the existing users in the user list that are located within the predetermined distance range, so as to find out object users located within the detection range of the Bluetooth communication device, the object user satisfies: the name of the Bluetooth communication device mounted on the mobile client corresponding to the object user is included in the list of names of all the other detected Bluetooth communication devices transmitted from the mobile client corresponding to the requesting user, and the name of the Bluetooth communication device mounted on the mobile client corresponding to the requesting user is included in the list of names of all the other detected Bluetooth communication devices transmitted from the mobile client corresponding to the object user; and the condensed identity information of the object user in the user list is displayed on the mobile client corresponding to the requesting user.

Optionally, steps of acquiring from the electronic business card delivery server the list of users corresponding to the neighboring mobile clients located within the predetermined distance range and located within the detection range of the Bluetooth communication device, and displaying the condensed identity information of the users in the user list of the mobile client corresponding to the requesting user comprises: the electronic business card delivery server receives a list of names of the mounted Bluetooth communication devices transmitted from the mobile clients corresponding to respective users, and names of all the other Bluetooth communication devices detected by the Bluetooth communication device; with respect to the requesting user, the electronic business card delivery server provides the requesting user with users located in the detection range of the Bluetooth communication device, said user satisfies: name of the Bluetooth communication device mounted on the mobile client corresponding to the user is included in the list of names of all the other detected Bluetooth communication devices transmitted from the mobile client corresponding to the requesting user, and the name of the Bluetooth communication device mounted on the mobile client corresponding to the requesting user is included in the list of names of all the other detected Bluetooth communication devices transmitted from the mobile client corresponding to the user; and the condensed identity information of the users in the user list is displayed on the mobile client corresponding to the requesting user; the electronic business card delivery server receives the geographical location information transmitted from the mobile clients corresponding to respective users; with respect to the requesting user, the electronic business card delivery server filters the existing users located in the user list that are within the detection range of the Bluetooth communication device, so as to find out object users located within the predetermined distance range; and, the condensed identity information of the object users in the user list is displayed on the mobile client corresponding to the requesting user.

Optionally, the electronic business card delivery server further operates to: update the user list according to new present geographical location information submitted by the mobile client, changes to the present geographical location information submitted by the mobile client, changes to the condensed identity information submitted by the user, changes to the name of the mounted Bluetooth communication device, and/or changes to the list of names of all the other Bluetooth communication devices detected by the Bluetooth communication device; send the updated user list as well as the condensed identity information of users in the updated user list to the mobile client corresponding to the requesting user; and update the information in the electronic business card of users.

Optionally, the electronic business card is transmitted to the electronic business card delivery server when the requesting user submits the electronic business card delivery request and when the object user confirms the electronic business card delivery request, or the electronic business card is prestored in the electronic business card delivery server by the requesting user and the object users.

Another aspect of the invention provides a system for delivering an electronic business card by combining geographical location information and Bluetooth technology, characterized in that, the system comprises an electronic business card delivery server and a mobile client which has established a communication link with the electronic business card delivery server; the mobile client is used for: transmitting the present geographical location information, the name of the mounted Bluetooth communication device, and a list of names of all the other Bluetooth communication devices detected by the Bluetooth communication device to the electronic business card delivery server; acquiring a list of users corresponding to neighboring mobile clients located within a predetermined distance range and located within a detection range of the Bluetooth communication device from the electronic business card delivery server, and displaying the condensed identity information of users in the user list; selecting one or more users from the user list, as the object users of the electronic business card delivery, issuing an electronic business card delivery request for delivering the electronic business card to the object users and/or for acquiring the electronic business card from the object users, and transmitting the electronic business card delivery request to the electronic business card delivery server; the electronic business card delivery server is used for: transmitting the electronic business card delivery request to the mobile client corresponding to the selected user, and upon receiving a confirmation information transmitted from the mobile clients corresponding to the object users, responding to the electronic business card delivery request so as to deliver the electronic business card of the requesting user to the mobile client corresponding to the object user and/or deliver the electronic business card of the object user to the mobile client corresponding to the requesting user.

Optionally, the mobile client comprises: a positioning unit, for acquiring the present geographical location information; a Bluetooth information providing unit, for providing the name of the mounted Bluetooth communication device, and a list of names of all the other Bluetooth communication devices detected by the Bluetooth communication device; a display unit; a selecting unit, for selecting one or more users from the user list displayed on the display unit and transmitted from the electronic business card delivery server, as the object users of the electronic business card delivery; an electronic business card delivery request unit, for generating an electronic business card delivery request for delivering the electronic business card to the object users and/or for acquiring the electronic business card from the object users, for the object users selected by the selecting unit; the electronic business card delivery request being transmitted via the electronic business card delivery server to the mobile client corresponding to the selected user; a request confirmation unit, for confirming the electronic business card delivery request transmitted from the mobile client corresponding to the requesting user, and transmitting the confirmation information to the electronic business card delivery server; a storage unit, for storing the electronic business card of its own users and the electronic business card of the object user which is received via the information transmit-receive unit and is issued by the electronic business card delivery server in response to the confirmation information of the mobile client corresponding to the object user;

the electronic business card delivery server comprises an information transmit-receive unit, for receiving the present geographical location information, the name of the mounted Bluetooth communication device, the list of names of all the other Bluetooth communication devices detected by the Bluetooth communication device, condensed identity information and/or electronic business card, which are transmitted from respective mobile client; transmitting the received condensed identity information and/or electronic business card of users to respective mobile client; and transmitting the electronic business card delivery request transmitted from the mobile client corresponding to the requesting user, to the mobile client corresponding to the selected user; the electronic business card delivery request being for delivering the electronic business card to the object users and/or for acquiring the electronic business card from the object users; a geographical location information confirmation unit, for after receiving the present geographical location information transmitted from the mobile client corresponding to the requesting user, analyzing the present geographical location information of the mobile client corresponding to the requesting user as well as the present geographical location information of the mobile client corresponding to other users, in order to determine whether or not distance between other users and the requesting user is within the predetermined distance range; a Bluetooth information searching unit, for finding out users located within the detection range of the Bluetooth communication device from the name list, after receiving the name of the mounted Bluetooth communication device and the list of names of all the other Bluetooth communication devices detected by the Bluetooth communication device transmitted from the mobile client corresponding to the requesting user; an identity information providing unit, for transmitting a list of users corresponding to the neighboring mobile clients which are confirmed by the geographical location information confirmation unit to be located within the predetermined distance range and confirmed by the Bluetooth information searching unit to be located within the detection range of the Bluetooth communication device, to the mobile client corresponding to the requesting user, and displaying the condensed identity information of users in the user list on the mobile client; an electronic business card providing unit, for responding to the electronic business card delivery request after receiving the confirmation information transmitted from the mobile client corresponding to the object user, so as to transmit the electronic business card of the requesting user to the mobile client corresponding to the object user and/or transmitting the electronic business card of the object user to the mobile client corresponding to the requesting user by the information transmit-receive unit; a database, for storing the present geographical location information, the name of the mounted Bluetooth communication device, the list of names of all the other Bluetooth communication devices detected by the Bluetooth communication device, the condensed identity information and/or the electronic business card of the user corresponding to respective mobile clients, which are transmitted from respective mobile clients.

Optionally, the electronic business card delivery server further comprises an updating unit, which is used for: updating the user list according to new present geographical location information submitted by the mobile client, changes to the present geographical location information submitted by the mobile client, changes to the condensed identity information submitted by the user, changes to the name of the mounted Bluetooth communication device, and/or changes to the list of names of all the other Bluetooth communication devices detected by the Bluetooth communication device; sending the updated user list as well as the condensed identity information of users in the updated user list to the mobile client corresponding to the requesting user; and updating the information in the electronic business card of users.

Optionally, the condensed identity information is transmitted to the electronic business card delivery server together with the geographical location information, or the condensed identity information is prestored in the electronic business card delivery server.

Optionally, the electronic business card is transmitted to the electronic business card delivery server when the requesting user submits the electronic business card delivery request and when the object user confirms the electronic business card delivery request, or the electronic business card is prestored in the electronic business card delivery server by the requesting user and the object users.

The invention provides a method and system for delivering an electronic business card by combining geographical location information and Bluetooth technology that uses the electronic business card delivery server to put the geographical location information of respective mobile clients, the name of the mounted Bluetooth communication device, the list of names of all the other Bluetooth communication devices detected by the Bluetooth communication device as well as the condensed identity information of users together; thus, according to the above information, the requesting user can select one or more users that are located within the predetermined distance range and also located within the detection range of the Bluetooth communication device, so as to deliver the electronic business card, thus bringing convenience for people delivering the electronic business card. Compared with the prior art, the operation is simple, and the accuracy and safety of contents of the electronic business card are guaranteed.

Additionally, by applying the invention, the geographic distance between users can be estimated simply from the connection status of Bluetooth communication devices, and there is no need to establish an actual Bluetooth connection, thus avoiding the trouble of inputting password required to establish a Bluetooth wireless communication connection.

DETAILED DESCRIPTION OF THE PREFERRED EMBODIMENTS

The inventor of the invention found out that: the conventional way of storing business card information requires people to directly input such information into an electronic storage device, or use image processing and optical character recognition technology to process and recognize the picture obtained by shooting the business card and then saving the recognized information, or send the contents of the electronic business card in text format by means of SMS, e-mail and the like, or deliver data by using the Bluetooth technology, and so on. However, all those methods inevitably have some defects, for example, operations for inputting information data is tedious, it is inconvenient to manage business card information, and the accuracy of the inputted information data can't be guaranteed.

Thus, the inventor of the invention makes improvements to the prior art, and provides a method and system for delivering an electronic business card by combining geographical location information and Bluetooth technology, which by using the geographical location information of respective mobile clients, the name of the mounted Bluetooth communication device, and the list of names of all the other Bluetooth communication devices detected by the Bluetooth communication device, enable the electronic business card delivery server to provide the requesting user with other users that are located within the predetermined distance range and also located within the detection range of the Bluetooth communication device, so that the requesting user can deliver the electronic business card with respect to one or more users selected according to the above information, thus bringing convenience for people delivering the electronic business card. Compared with the prior art, the operation is simple, and the accuracy and safety of contents of the electronic business card are guaranteed.

In the following, the invention will be described in detail by some specific embodiments.

Figure 1:
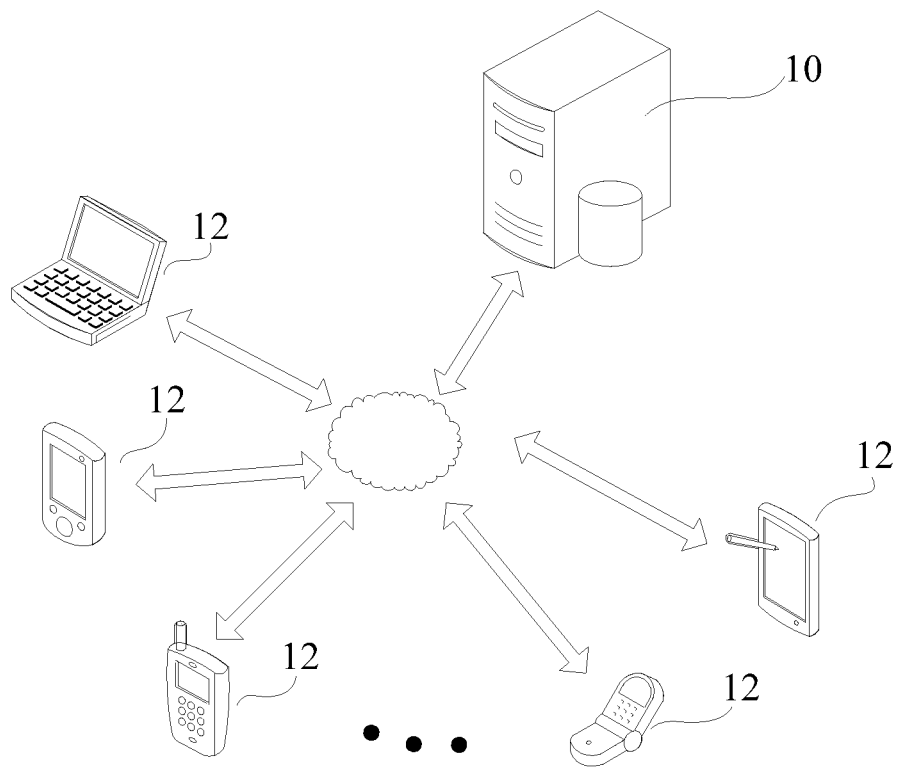
FIG. 1 is a schematic diagram of the system for delivering an electronic business card of the invention.

FIG. 1 is a schematic diagram of the system for delivering an electronic business card of the invention.

As shown in FIG. 1, the system for delivering an electronic business card comprises: the electronic business card delivery server 10, and one or more mobile client 12 that establish the communication link with the electronic business card delivery server 10. Through the communication link, respective mobile clients 12 can be connected as a whole. By using the electronic business card delivery server 10, information (including the electronic business card) sent from respective mobile client 12 can be collected, checked, and managed, and the desired electronic business card is provided to the mobile client 12 according to the electronic business card delivery request issued by the mobile client 12, thus bringing convenience for people delivering the electronic business card; also, the operation is simple, and the accuracy and safety of contents of the electronic business card are guaranteed.

Figure 2:
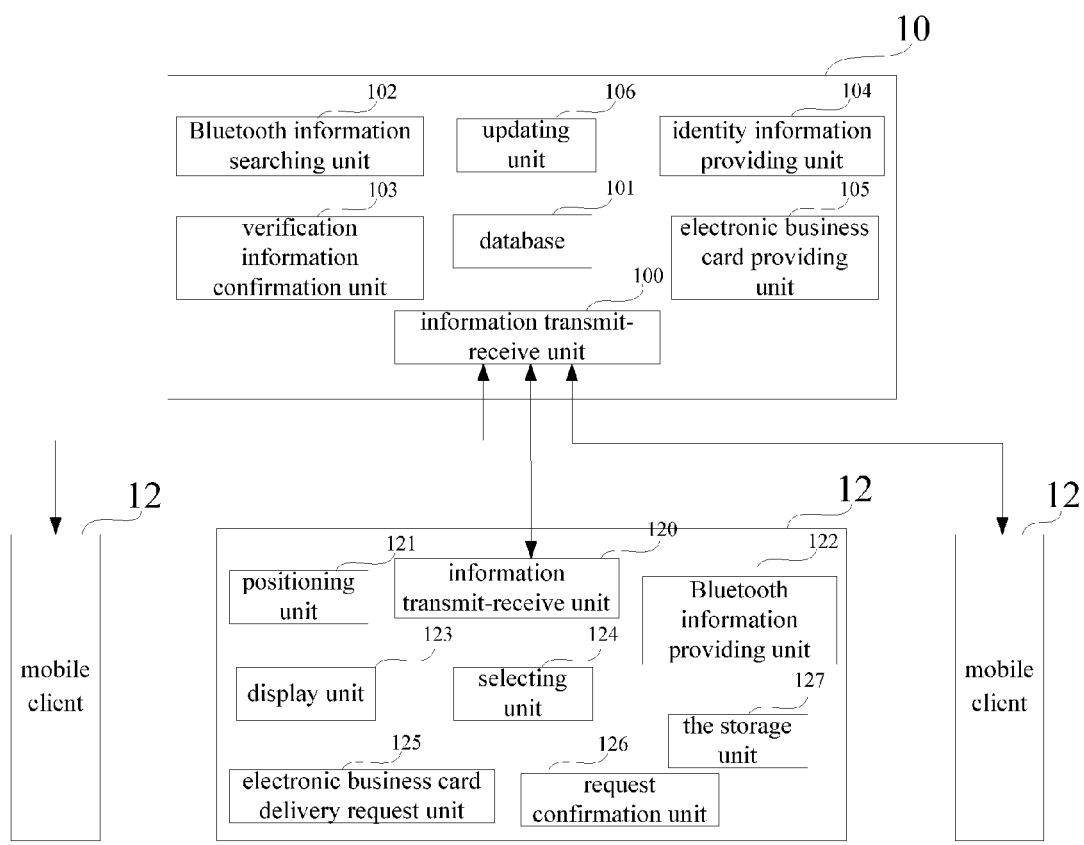
FIG. 2 is a structural diagram of the system for delivering an electronic business card of the invention.

FIG. 2 is a structural diagram of the system for delivering an electronic business card of the invention.

the mobile client 12 is used to: transmit the present geographical location information, the name of the mounted Bluetooth communication device, and the list of names of all the other Bluetooth communication devices detected by the Bluetooth communication device to the electronic business card delivery server 10; a list of users corresponding to neighboring mobile clients located within a predetermined distance range and located within a detection range of the Bluetooth communication device from the electronic business card delivery server 10, and display the condensed identity information of users in the user list; select one or more users from the user list, as the object users of the electronic business card delivery; submit an electronic business card delivery request for delivering the electronic business card to the object users and/or acquiring the electronic business card from the object users, and send the electronic business card delivery request to the electronic business card delivery server 10.

As shown in FIG. 2, the mobile client 12 comprises: an information transmit-receive unit 120, a positioning unit 121, a Bluetooth information providing unit 122, a display unit 123, a selecting unit 124, an electronic business card delivery request unit 125, a request confirmation unit 126, a the storage unit 127. In practical application, the mobile client 12 could be any of a cellphone, a PDA, a tablet computer or a laptop.

In the following, each unit of the mobile client 12 will be described in detail.

The information transmit-receive unit 120 is used to establish the communication connection with the electronic business card delivery server 10 so as to deliver information with each other. In the invention, said information may include the present geographical location information, the name of the mounted Bluetooth communication device, the list of names of all the other Bluetooth communication devices detected by the Bluetooth communication device, the condensed identity information and the electronic business card of the user, etc.

It should be noted that, the mobile client 12 is in communication connection with the electronic business card delivery server 10, and such communication connection may be a TCP/IP based Ethernet, an internet, Wi-Fi wireless Internet and so on, and may be a mobile communication network such as 2G, 3G (including Wideband Code Division Multiple Access (WCDMA), Time division-synchronous code division multiple access (TD-SCDMA)), Long Term Evolution (LTE) or Worldwide Interoperability for Microwave Access (WIMAX)).

The condensed identity information includes but is not limited to: the name of the user, the nickname of the user, company name of the user, head picture of the user, and a picture set by the user to represent his/her identification.

The information of the electronic business card includes but is not limited to: contact information of the user in text format (including name, telephone number, e-mail, company, department, job title, address and so on); picture of the business card of the user; the head picture of the user; multimedia information designated by the user such as text, voice, image and video.

The positioning unit 121 is used to acquire the present geographical location information. As used here, said geographical location can have different source depending on what kind of communication device the mobile client 12 is. Taking the common cellphone as example, the geographical location information includes but is not limited to: 1. GPS information automatically obtained by the GPS device built in the cellphone; 2. position information of the mobile base station where the cellphone is currently located.

The Bluetooth information providing unit 122 is used to provide the name of the mounted Bluetooth communication device, and the list of names of all the other Bluetooth communication devices detected by the Bluetooth communication device.

The mobile client 12 is provided with a Bluetooth communication device. Bluetooth technology is effectively a short-range wireless communication technology. By using the Bluetooth technology, communication between mobile communication terminal devices such as tablet computers, laptops, mobile phones and cellphones can be simplified, and communication between above mobile communication terminal devices and the Internet can be successfully simplified, thus such modern communication devices can be interconnected without cables so as to constitute a huge wireless communication network.

In practical application, the Bluetooth communication device in the mobile client 12 can be named or renamed.

When the Bluetooth communication device is used, whether or not there are any other Bluetooth communication devices around with which a communication connection can establish can be detected, the names of the detected Bluetooth communication device can be listed so as to constitute a name list. One Bluetooth communication device in the name list can be selected in order to establish a matched connection with it, thus realizing data transmission.

The display unit 123 is used to display all kinds of information, for example, the list of users corresponding to the neighboring mobile clients which are located within the predetermined distance range and located within the detection range of the Bluetooth communication device, transmitted from the electronic business card delivery server 10, the condensed identity information of each user in the user list, and the electronic business card of each user. In the invention, the display unit can be an LCD (liquid crystal display). As used here, the predetermined distance range can be differently set according to the practical application environment.

The selecting unit 124 is used to select one or more users from the user list transmitted from the electronic business card delivery server 10 and displayed on the display unit 123, as the object users of the electronic business card delivery.

The electronic business card delivery request unit 125 is used to generate the electronic business card delivery request with respect to the object users selected by the selecting unit 124. In the invention, the electronic business card delivery request includes but is not limited to: 1. delivering its own electronic business card to the selected object users; 2. obtaining from the selected object users their electronic business card(s); 3. exchanging the electronic business cards with the selected object users. As for the above three situations, any one of them is selected by means of the electronic business card delivery request unit 125.

Then, the electronic business card delivery request may be transmitted to the electronic business card delivery server 10 via the information transmit-receive unit 120, and then be transmitted to one or more mobile clients 12 corresponding to the selected object users via the electronic business card delivery server 10; after that, the selected object users confirm the electronic business card delivery request.

The request confirmation unit 126 is used to confirm the electronic business card delivery request transmitted from the mobile client corresponding to the requesting user 12, and transmit the confirmation information to the electronic business card delivery server 10.

Usually, when the object user receives the electronic business card delivery request transmitted from the mobile client 12 of the requesting user, the object user can check the condensed identity information of the requesting user, so as to decide whether or not it is necessary to confirm the electronic business card delivery request. If the electronic business card delivery request is allowed, confirmation is made through the request confirmation unit 126; if the electronic business card delivery request is not allowed, cancel or rejection is made through the request confirmation unit 126.

Obviously, operation for confirming such electronic business card delivery request may be different; for example, in a certain situation, the object users can previously make settings such that the request confirmation unit 126 will automatically confirm in order to realize the delivery or exchange of the electronic business cards, which means that the electronic business card delivered from the requesting user is automatically received or the electronic business cards are automatically exchanged with the requesting user; in another situation, the object users may previously inform the electronic business card delivery server 10 that, when the electronic business card delivery request is related to the object user, the content of the electronic business card delivery request can be directly performed so as to deliver the electronic business card without asking the object user for confirmation information.

The storage unit 127 is used to store the electronic business card of its own users and the electronic business cards of the object user which are received via the information transmit-receive unit 120 and is issued by the electronic business card delivery server 10 in response to the confirmation information of the mobile client corresponding to the object user 12.

The electronic business card delivery server 10 is used to: according to the present geographical location information, the name of the mounted Bluetooth communication device, and the list of names of all the other Bluetooth communication devices detected by the Bluetooth communication device, which are received from the mobile client corresponding to the requesting user 12, transmit a list of users corresponding to the neighboring mobile clients that are located within the predetermined distance range and also located within the detection range of the Bluetooth communication device to the mobile client corresponding to the requesting user 12; and, send the electronic business card delivery request to the mobile client corresponding to the selected user 12, and upon receiving a confirmation information transmitted from the mobile clients corresponding to the object user 12, respond to the electronic business card delivery request so as to deliver the electronic business card of the requesting user to the mobile client corresponding to the object user 12 and/or deliver the electronic business card of the object user to the mobile client corresponding to the requesting user 12.

As shown in FIG. 2, the electronic business card delivery server 10 comprises: an information transmit-receive unit 100, a database 101, a geographical location information confirmation unit 102, a Bluetooth information searching unit 103, an identity information providing unit 104, an electronic business card providing unit 105, and an updating unit 106.

The information transmit-receive unit 100 is used to establish communication connections with the mobile client 12, so as to transfer information to each other. In the invention, said information may include the present geographical location information of the mobile client 12, the name of the mounted Bluetooth communication device, and the list of names of all the other Bluetooth communication devices detected by the Bluetooth communication device, the condensed identity information and the electronic business card of the user, and so on.

The mobile client 12 is provided with a Bluetooth communication device.

In practical application, the Bluetooth communication device in the mobile client 12 can be named or renamed; and the names of other neighboring Bluetooth communication devices suitable for the communication connection can be displayed.

the condensed identity information includes but is not limited to: the name of the user, the nickname of the user, company name of the user, head picture of the user, and a picture set by the user to represent his/her identification.

The information of the electronic business card includes but is not limited to: contact information of the user in text format (including name, telephone number, e-mail, company, department, job title, address and so on); picture of the business card of the user; the head picture of the user; multimedia information designated by the user such as text, voice, image and video.

The database 101 is used to store the present geographical location information transmitted from respective mobile client, the name of the mounted Bluetooth communication device, the list of names of all the other Bluetooth communication devices detected by the Bluetooth communication device, the condensed identity information and/or the electronic business cards of users corresponding to respective mobile clients.

In the invention, the condensed identity information and the electronic business cards of users can be stored after they are received from the mobile client 12 during the actual transmission of the electronic business card, or may be prestored.

The condensed identity information is transmitted to the electronic business card delivery server together with the geographical location information, or the condensed identity information is prestored in the electronic business card delivery server.

The electronic business card is transmitted to the electronic business card delivery server when the request user submits the electronic business card delivery request and when the object user confirms the electronic business card delivery request, or the electronic business card is prestored in the electronic business card delivery server by the requesting user and the object users.

The geographical location information confirmation unit 102 is used to analyze the present geographical location information of the mobile client corresponding to the requesting user 10 and the present geographical location information of the mobile clients 10 corresponding to other users, after the present geographical location information transmitted from the mobile client corresponding to the requesting user 10 is received, so as to determine whether distance between other users and the requesting user is within the predetermined distance range. In the invention, as used here, the predetermined distance range can be differently set according to the practical application environment.

The Bluetooth information searching unit 103 is used to find out users that are located within the detection range of the Bluetooth communication device from the name list, after receiving the name of the mounted Bluetooth communication device and the list of names of all the other Bluetooth communication devices detected by the Bluetooth communication device transmitted from the mobile client corresponding to the requesting user 12.

As for finding out users that are located within the detection range of the Bluetooth communication device, such users satisfy: name of the Bluetooth communication device mounted on the mobile client corresponding to the user is included in the list of names of all the other detected Bluetooth communication devices transmitted from the mobile client corresponding to the requesting user, the name of the Bluetooth communication device mounted on the mobile client corresponding to the requesting user is included in the list of names of all the other detected Bluetooth communication devices transmitted from the mobile client corresponding to the user; and the condensed identity information of users in the user list is displayed on the mobile client corresponding to the requesting user.

The identity information providing unit 104 is used to, after receiving the present geographical location information, the name of the mounted Bluetooth communication device, and the list of names of all the other Bluetooth communication devices detected by the Bluetooth communication device transmitted from the mobile client corresponding to the request user 12, transmit a list of users corresponding to the neighboring mobile clients that are located within the predetermined distance range and are also found by the Bluetooth information searching unit 103 to be located within the detection range of the Bluetooth communication device, to the mobile client corresponding to the requesting user 12, and to display the condensed identity information of users in the user list on the mobile client 12, for the requesting user to choose on the mobile client 12.

After that, the requesting user can choose one or more users in the user list on the mobile client 12 as the object users, and issues a corresponding electronic business card delivery request. The information transmit-receive unit 100 of the electronic business card server 10 in turn can transmit the electronic business card delivery request to one or more mobile client(s) 12 corresponding to the object users, so that such one or more mobile clients 12 of corresponding users can make confirmation.

In the invention, the electronic business card delivery request includes but is not limited to: 1. transmitting its own electronic business card to the selected object users; 2. obtaining from the selected object users their electronic business card(s); 3. exchanging the electronic business cards with the selected object users. As for the above three situations, one of them can be selected by the electronic business card delivery request unit 125.

The electronic business card providing unit 105 is used to respond to the electronic business card delivery request after receiving the confirmation information sent by the mobile client corresponding to the object user 12, so as to transmit the electronic business card of the requesting user to the mobile client corresponding to the object user 12 and/or so as to transmit the electronic business card of the object user to the mobile client corresponding to the requesting user 12, via the information transmit-receive unit 100.

The updating unit 106 is used to update the user list according to the new present geographical location information submitted by the mobile client, changes to the present geographical location information submitted by the mobile client, changes to the condensed identity information submitted by the user, changes to the name of the mounted Bluetooth communication device, and/or changes to the list of names of all the other Bluetooth communication devices detected by the Bluetooth communication device; send the updated user list as well as the condensed identity information of users in the user list to the mobile client corresponding to the requesting user; and update the information in the electronic business card of users.

Additionally, information updated by the updating unit 106 (the present geographical location information, confirmation message, the condensed identity information, information of the electronic business card and the like) can also be stored in the database 101.

Figure 3:
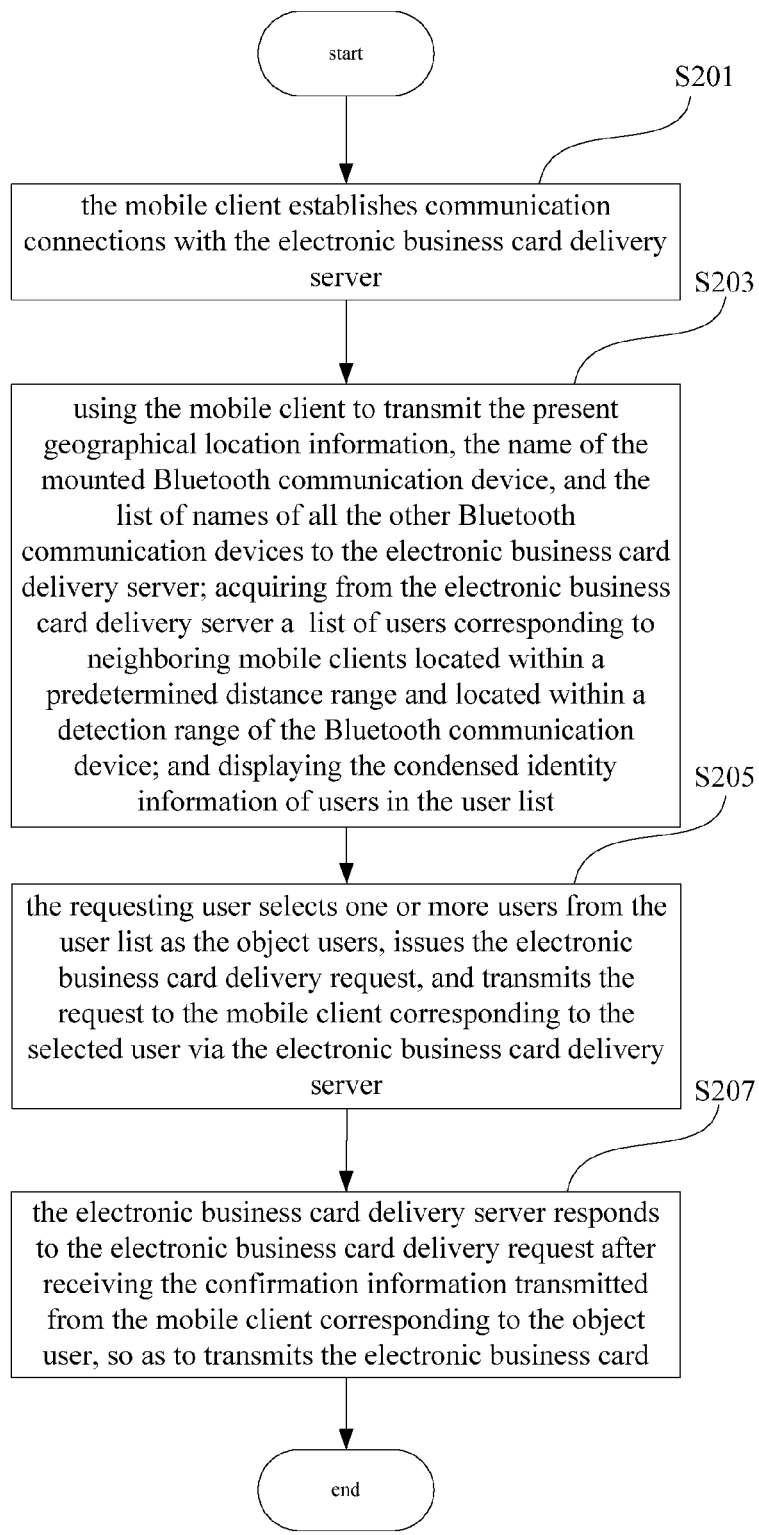
FIG. 3 is a flow chart of the method for delivering an electronic business card of the invention.

The invention provides another method for delivering an electronic business card by combining geographical location information and Bluetooth technology. FIG. 3 shows the flow chart of such method.

As shown in FIG. 3, the method for delivering an electronic business card comprises:

Step S201: the mobile client establishes the communication connection with the electronic business card delivery server. In this step, the step of establishing the communication connection may comprise: the mobile client issues a request for connection, and after the electronic business card delivery server confirms, the communication connection is established; also, such step may comprise: the mobile client directly logs in the website to which the electronic business card delivery server belongs. Since the step of establishing communication connection is well known by those skilled in the art, description thereof is omitted.

Step S203: the requesting user uses the mobile client to transmit the present geographical location information, the name of the mounted Bluetooth communication device, and the list of names of all the other Bluetooth communication devices detected by the Bluetooth communication device to the electronic business card delivery server which has established a communication connection with the mobile client, acquires from the electronic business card delivery server a list of users corresponding to neighboring mobile clients located within a predetermined distance range and located within a detection range of the Bluetooth communication device, and displays the condensed identity information of users in the user list on the mobile client corresponding to the requesting user.

Additionally, in the invention, when the present geographical location information is transmitted, the condensed identity information of the requesting user can also be sent to the electronic business card delivery server. Obviously, in other situations, the condensed identity information can also be prestored in the electronic business card delivery server.

It should be noted that, in the invention, step S203 may have different embodiments according to practical applications.

Figure 4:
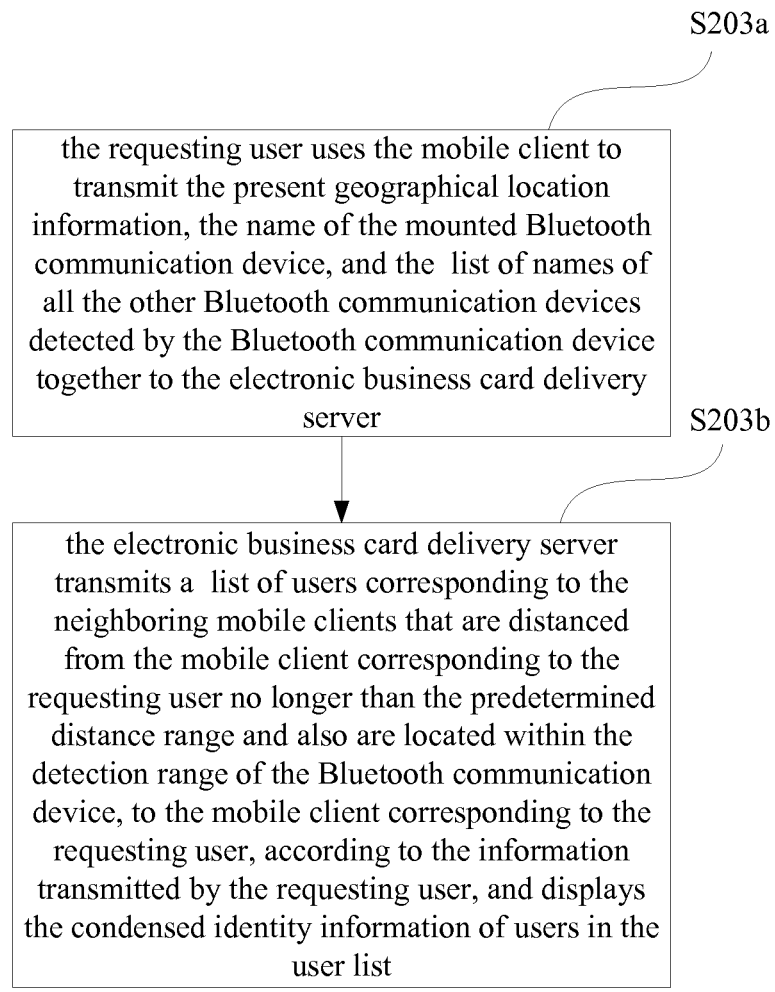
FIG. 4 to FIG. 6 are flow charts of step S203 of FIG. 3 according to different embodiments.

Referring to FIG. 4, which is a flow chart of the step S203 according to one of the embodiments. As shown in FIG. 4, step S203 can be divided into: step S203a, the requesting user uses the mobile client to transmit the present geographical location information, the name of the mounted Bluetooth communication device, and the list of names of all the other Bluetooth communication devices detected by the Bluetooth communication device together to the electronic business card delivery server which has established a communication connection with the mobile client; and step S203b, the electronic business card delivery server transmits a list of users corresponding to the neighboring mobile clients that are distanced from the mobile client corresponding to the requesting user no longer than the predetermined distance range and also are located within the detection range of the Bluetooth communication device, to the mobile client corresponding to the requesting user, according to the present geographical location information, the name of the mounted Bluetooth communication device, and the list of names of all the other Bluetooth communication devices detected by the Bluetooth communication device transmitted by the mobile client corresponding to the requesting user, and displays the condensed identity information of users in the user list on the mobile client.

Figure 5:
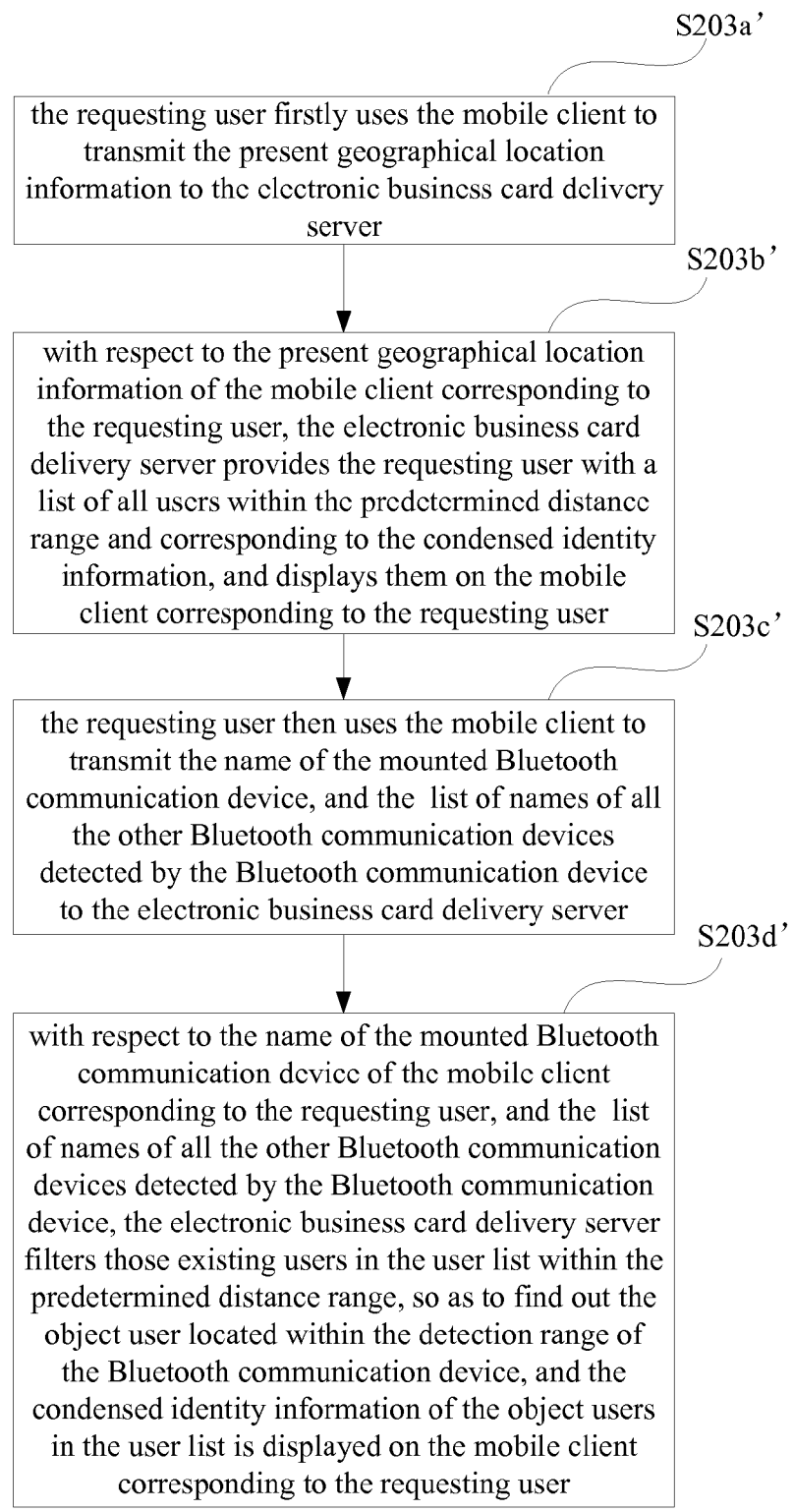

Referring to FIG. 5, which is a flow chart of the step S203 according to another embodiment. As shown in FIG. 5, step S203 can be divided into: step S203a', the requesting user firstly uses the mobile client to transmit the present geographical location information to the electronic business card delivery server that has established communication connections with the mobile client; step S203b', with respect to the present geographical location information of the mobile client corresponding to the requesting user, the electronic business card delivery server provides the requesting user with a list of all users within the predetermined distance range and corresponding condensed identity information, and displays them on the mobile client corresponding to the requesting user; step S203c', the requesting user then uses the mobile client to transmit the name of the mounted Bluetooth communication device, and the list of names of all the other Bluetooth communication devices detected by the Bluetooth communication device to the electronic business card delivery server; step S203d', with respect to the name of the mounted Bluetooth communication device of the mobile client corresponding to the requesting user, and the list of names of all the other Bluetooth communication devices detected by the Bluetooth communication device, the electronic business card delivery server filters those existing users in the user list within the predetermined distance range, so as to find out the object user located within the detection range of the Bluetooth communication device, wherein the object user satisfies: the name of the Bluetooth communication device mounted on the mobile client corresponding to the object user is included in the list of names of all the other detected Bluetooth communication devices transmitted from the mobile client corresponding to the request user, the name of the Bluetooth communication device mounted on the mobile client corresponding to the requesting user is included in the list of names of all the other detected Bluetooth communication devices transmitted from the mobile client corresponding to the object user; and the condensed identity information of the object users in the user list is displayed on the mobile client corresponding to the requesting user.

Figure 6:
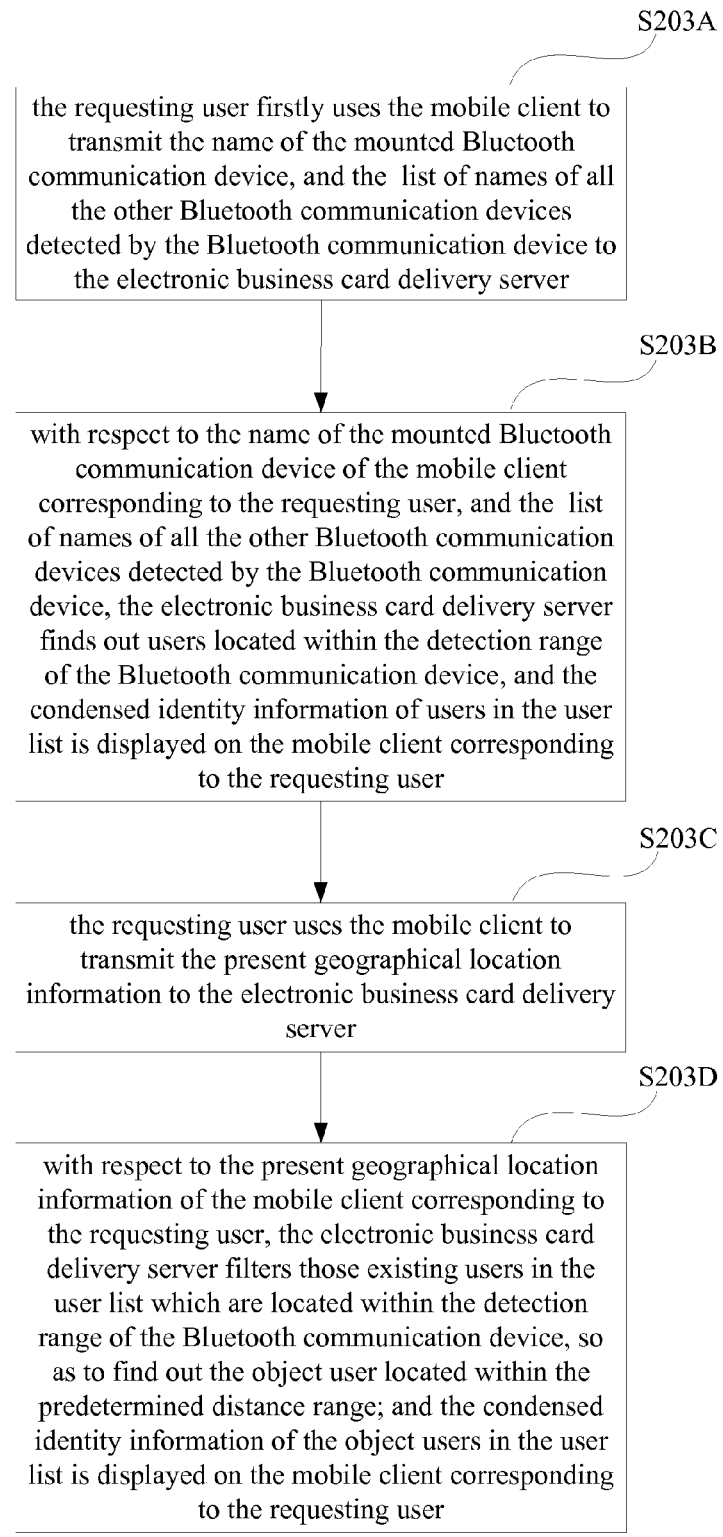

Referring to FIG. 6, which is a flow chart of the step S203 according to yet another embodiment. As shown in FIG. 6, step S203 can be divided into: step S203A, the requesting user firstly uses the mobile client to transmit the name of the mounted Bluetooth communication device, and the list of names of all the other Bluetooth communication devices detected by the Bluetooth communication device, to the electronic business card delivery server which has established a communication connection with the mobile client; step S203B, with respect to the name of the mounted Bluetooth communication device of the mobile client corresponding to the requesting user, and the list of names of all the other Bluetooth communication devices detected by the Bluetooth communication device, the electronic business card delivery server finds out users located within the detection range of the Bluetooth communication device, wherein the user satisfies: the name of the Bluetooth communication device mounted on the mobile client corresponding to the user is included in the list of names of all the other detected Bluetooth communication devices transmitted from the mobile client corresponding to the requesting user, and the name of the Bluetooth communication device mounted on the mobile client corresponding to the requesting user is included in the list of names of all the other detected Bluetooth communication devices transmitted from the mobile client corresponding to the user; and the condensed identity information of users in the user list is displayed on the mobile client corresponding to the requesting user; step S203C, the requesting user then uses the mobile client to transmit the geographical location information to the electronic business card delivery server; step S203D, with respect to the present geographical location information of the mobile client corresponding to the requesting user, the electronic business card delivery server filters those existing users in the user list which are located within the detection range of the Bluetooth communication device, so as to find out the object user located within the predetermined distance range; and the condensed identity information of the object users in the user list is displayed on the mobile client corresponding to the requesting user.

It should be noted that, in the embodiment shown in FIG. 6, step S203B is firstly performed, and then users within the detection range of the Bluetooth communication device is found out; then step S203D is performed, so as to filter the user list according to the geographical location information. In this way, the Bluetooth communication devices having same name settings can then be discriminated by geographical locations, thus avoiding confusion with each other.

Obviously, the above description only shows several different embodiments of the step S203; however, the invention is not limited to this.

In step S205, the requesting user selects one or more users from the user list displayed by the mobile client, as the object users of the electronic business card delivery, issues the electronic business card delivery request, and transmits the electronic business card delivery request to the electronic business card delivery server, so that the electronic business card delivery server can transmit the electronic business card delivery request to the mobile client corresponding to the selected user.

In the invention, the electronic business card delivery request includes but is not limited to: 1. delivering its own electronic business card to the selected object users; 2. obtaining from the selected object users their electronic business card(s); 3. exchanging the electronic business cards with the selected object users. As for above three situations, any one of them is selected by means of the electronic business card delivery request unit 125.

In step S207, the electronic business card delivery server responds to the electronic business card delivery request after receiving the confirmation information transmitted from the mobile client corresponding to the object user, so as to transmit the electronic business card of the requesting user to the mobile client corresponding to the object user and/or transmit the electronic business card of the object user to the mobile client corresponding to the requesting user.

Wherein, the electronic business card is transmitted to the electronic business card delivery server when the requesting user submits the electronic business card delivery request and when the object user confirms the electronic business card delivery request, or the electronic business card is prestored in the electronic business card delivery server by the requesting user and the object users.

Usually, when the object user receives the electronic business card delivery request transmitted from the mobile client of the requesting user, the object user can check the condensed identity information of the requesting user, so as to decide whether or not it is necessary to confirm the electronic business card delivery request. If the electronic business card delivery request is allowed, confirmation is made and the confirmation information is sent to the electronic business card delivery server; if the electronic business card delivery request is not allowed, cancellation or rejection is made.

Obviously, the operation for confirming such electronic business card delivery request may be different; for example, the object users can previously make settings such that the corresponding mobile client will automatically confirm in order to realize the delivery or exchange of the electronic business cards, which means that the electronic business card delivered from the requesting user is automatically received, or the electronic business cards are automatically exchanged with the requesting user.

Additionally, in the invention, the electronic business card delivery server also operates to: update the user list according to the new present geographical location information submitted by the mobile client, changes to the present geographical location information submitted by the mobile client, and/or changes to the condensed identity information submitted by user; and send the updated user list as well as the condensed identity information of users in the user list to the mobile client corresponding to the requesting user; and update the information in the electronic business card of users.

By means of examples, applications showing how the invention acquires specific information will be described in detail in the following.

Embodiment I

The requesting user A installs a software with the business card delivery function on the cellphone a, and establishes communication connections with the server of website "W". The requesting user A uses the cellphone a to upload the present geographical location information of the cellphone a, the name of the mounted Bluetooth communication device, the list of names of all the other Bluetooth communication devices detected by the Bluetooth communication device and the condensed identity information of the requesting user A onto the server of website "W". The server of website "W" transmits the list of users (for example, users B, C, D, E, F) of other cellphones (for example, cellphones b, c, d, e, f) that are distanced from the cellphone a no longer than a certain distance (for example, 500 m) and also are located within the detection range of the Bluetooth communication device to the cellphone a, according to the present geographical location information of the cellphone a, the name of the mounted Bluetooth communication device, and the list of names of all the other Bluetooth communication devices detected by the Bluetooth communication device, and displays the condensed identity information of each user B, C, D, E, F in the user list. The requesting user A reads the condensed identity information of each user B, C, D, E, F, and selects users B and C from them as the object users according to practical requirements; issues the electronic business card delivery request for transmitting the electronic business card of the requesting user A to users B, C; and transmits the electronic business card delivery request via the server of website "W" to the cellphones b, c corresponding to the users B and C. The server of website "W" responds to the electronic business card delivery request after receiving the confirmation information from cellphones b and c, and transmits the electronic business card of the requesting user A to cellphones b and c corresponding to users B and C.

Additionally, in the first embodiment, if one (either user B or user C) of users B or C confirms the electronic business card delivery request submitted by the requesting user A, the server of website "W" will only transmit the electronic business card of the requesting user A to the cellphone corresponding to the user who makes the confirmation; if none of users B and C confirms the electronic business card delivery request submitted by the requesting user A, the server of website "W" takes no action.

Moreover, the operation for confirming such electronic business card delivery request may be different; for example, users B and C can previously set the cellphones b and c to make automatic confirmations; or, the server of website "W" may be previously informed, so that the electronic business card can be directly delivered without a confirmation.

Embodiment II

The requesting user A installs a software with the business card delivery function on cellphone a, and establishes a communication connection with the server of website "W". The requesting user A uses cellphone a to upload the present geographical location information of cellphone a, the name of the mounted Bluetooth communication device, the list of names of all the other Bluetooth communication devices detected by the Bluetooth communication device, and the condensed identity information of the requesting user A onto the server of website "W". The server of website "W" transmits the list of users (for example, users B, C, D, E, F) of other cellphones (for example, cellphones b, c, d, e, f) that are distanced from cellphone a no longer than a certain distance (for example, 500 m) and also are located within the detection range of the Bluetooth communication device to cellphone a, according to the present geographical location information of cellphone a, and displays the condensed identity information of each user B, C, D, E, F in the user list. The requesting user A reads the condensed identity information of each user B, C, D, E, F, and selects users B, C, D from them as the object users according to practical requirements, issues the electronic business card delivery request for acquiring from users B, C, D their electronic business cards, and transmits the electronic business card delivery request via the server of website "W" to cellphones b, c, d corresponding to users B, C, D. The server of website "W" responds to the electronic business card delivery request after receiving the confirmation information from cellphones b, c, d, so as to transmit the electronic business cards of users B, C, D to cellphone a corresponding to the requesting user A.

Embodiment III

The requesting user A installs a software with the business card delivery function on cellphone a, and establishes a communication connection with the server of website "W". The requesting user A uses cellphone a to upload the present geographical location information of cellphone a, the name of the mounted Bluetooth communication device, the list of names of all the other Bluetooth communication devices detected by the Bluetooth communication device, and the condensed identity information of the requesting user A onto the server of website "W". The server of website "W" transmits the list of users (for example, users B, C, D, E, F) of other cellphones (for example, cellphones b, c, d, e, f) that are distanced from cellphone a no longer than a certain distance (for example, 100 m) and also are located within the detection range of the Bluetooth communication device to cellphone a, according to the present geographical location information of cellphone a, and displays the condensed identity information of each user B, C, D, E, F in the user list. The requesting user A reads the condensed identity information of each user B, C, D, E, F, selects users C and E from them as the object users according to practical requirements; issues the electronic business card delivery request for exchanging the electronic business cards with users C and E, and transmits the electronic business card delivery request via the server of website "W" to cellphones c and e corresponding to users C and E. The server of website "W" responds to the electronic business card delivery request after receiving the confirmation information from cellphones c and e, so as to transmit the electronic business card of users C and E to cellphone a corresponding to the requesting user A, and transmits the electronic business card of the requesting user A respectively to cellphones c and e corresponding to users C and E.

In summary, the invention provides a method and system for delivering an electronic business card by combining geographical location information and Bluetooth technology, which uses the electronic business card delivery server to put the geographical location information of respective mobile client, the name of the mounted Bluetooth communication device, the list of names of all the other Bluetooth communication devices detected by the Bluetooth communication device as well as the condensed identity information of users together; thus, according to the above information, the requesting user can select one or more users that are located within the predetermined distance range and also located within the detection range of the Bluetooth communication device, so as to deliver the electronic business card, thus bringing convenience for people delivering electronic business cards. Compared with the prior art, the operation is simple, and the accuracy and safety of contents of the electronic business card are guaranteed.

Additionally, by applying the invention, the geographic distance between users can be estimated simply from the connection status of Bluetooth communication devices, and there is no need to establish an actual Bluetooth connection, thus avoiding the trouble of inputting password required to establish a Bluetooth wireless communication connection.

The embodiments described above are only used to illustrate the principle and effects of the invention rather than to limit the invention. As for a person skilled in the art, modifications can be made without departing from the spirit and scope of the invention. Thus, the scope of protection of the invention is defined by the claims.

The invention claimed is:

1. A method for delivering an electronic business card by combining geographical location information and Bluetooth technology, characterized in that, the method comprises:

a requesting user, by using a mobile client, submits the present geographical location information, the name of a mounted Bluetooth communication device, and a list of names of all the other Bluetooth communication devices detected by the Bluetooth communication device to an electronic business card delivery server which has established a communication link with the mobile client, acquires from the electronic business card delivery server a list of users corresponding to neighboring mobile clients located within a predetermined distance range and located within the detection range of the Bluetooth communication device, and displays the condensed identity information of the users in the user list on the mobile client corresponding to the request user;

the requesting user selects one or more users from the user list displayed by the mobile client, as the object users of the delivery of the electronic business card, issues an electronic business card delivery request for delivering the electronic business card to the object users and/or for acquiring the electronic business card from the object users, and transmits the electronic business card delivery request to the electronic business card delivery server;

the electronic business card delivery server transmits the electronic business card delivery request to the mobile client corresponding to the selected user, and upon receiving the confirmation information transmitted from the mobile clients corresponding to the object users, responds to the electronic business card delivery request so as to deliver the electronic business card of the requesting user to the mobile client corresponding to the object user and/or deliver the electronic business card of the object user to the mobile client corresponding to the request user.

2. The method for delivering an electronic business card according to claim 1, characterized in that, the condensed identity information is transmitted to the electronic business card delivery server together with the geographical location information, or the condensed identity information is pre-stored in the electronic business card delivery server.

3. The method for delivering an electronic business card according to claim 1, characterized in that, step of acquiring from the electronic business card delivery server the list of users corresponding to the neighboring mobile clients located within the predetermined distance range and located within the detection range of the Bluetooth communication device, and displaying the condensed identity information of the users in the user list on the mobile client corresponding to the requesting user comprises:

the electronic business card delivery server receives the geographical location information transmitted from the mobile clients corresponding to respective users;

with respect to the requesting user, the electronic business card delivery server provides the requesting user with the list of users corresponding to the neighboring mobile clients located in the predetermined distance range, and displays the condensed identity information of the users in the user list on the mobile client corresponding to the requesting user;

the electronic business card delivery server receives a list of names of the mounted Bluetooth communication devices transmitted from the mobile clients corresponding to respective users, and names of all the other Bluetooth communication devices detected by the Bluetooth communication device;

with respect to the requesting user, the electronic business card delivery server filters the existing users in the user list that are located within the predetermined distance range, so as to find out object users located within the detection range of the Bluetooth communication device, the object user satisfies: the name of the Bluetooth communication device mounted on the mobile client corresponding to the object user is included in the list of names of all the other detected Bluetooth communication devices transmitted from the mobile client corresponding to the requesting user, and the name of the Bluetooth communication device mounted on the mobile client corresponding to the requesting user is included in the list of names of all the other detected Bluetooth communication devices transmitted from the mobile client corresponding to the object user; and the condensed identity information of the object user in the user list is displayed on the mobile client corresponding to the requesting user.

4. The method for delivering an electronic business card according to claim 1, characterized in that, step of acquiring from the electronic business card delivery server the list of users corresponding to the neighboring mobile clients located within the predetermined distance range and located within the detection range of the Bluetooth communication device, and displaying the condensed identity information of the users in the user list on the mobile client corresponding to the requesting user comprises:

the electronic business card delivery server receives a list of names of the mounted Bluetooth communication devices transmitted from the mobile clients corresponding to respective users, and names of all the other Bluetooth communication devices detected by the Bluetooth communication device;

with respect to the requesting user, the electronic business card delivery server provides the requesting user with user located in the detection range of the Bluetooth communication device, said user satisfies: name of the Bluetooth communication device mounted on the mobile client corresponding to the user is included in the list of names of all the other detected Bluetooth communication devices transmitted from the mobile client corresponding to the requesting user, and the name of the Bluetooth communication device mounted on the mobile client corresponding to the requesting user is included in the list of names of all the other detected Bluetooth communication devices transmitted from the mobile client corresponding to the user; and the condensed identity information of the users in the user list is displayed on the mobile client corresponding to the requesting user;

the electronic business card delivery server receives the geographical location information transmitted from the mobile clients corresponding to respective users;

with respect to the requesting user, the electronic business card delivery server filters the existing users located in the user list that are within the detection range of the Bluetooth communication device, so as to find out object users located within the predetermined distance range; and, the condensed identity information of the object users in the user list is displayed on the mobile client corresponding to the requesting user.

5. The method for delivering an electronic business card according to claim 1, characterized in that, the electronic business card delivery server further operates to: update the user list according to new present geographical location information submitted by the mobile client, changes of the present geographical location information submitted by the mobile client, changes of the condensed identity information submitted by user, changes of the name of the mounted Bluetooth communication device, and/or changes of the list of names of all the other Bluetooth communication devices detected by the Bluetooth communication device; send the updated user list as well as the condensed identity information of users in the updated user list to the mobile client corresponding to the request user; and update the information in the electronic business card of users.

6. The method for delivering an electronic business card according to claim 1, characterized in that, the electronic business card is transmitted to the electronic business card delivery server when the requesting user submits the electronic business card delivery request and when the object user confirms the electronic business card delivery request, or the electronic business card is prestored in the electronic business card delivery server by the requesting user and the object users.

7. A system for delivering an electronic business card by combining geographical location information and Bluetooth technology, characterized in that, the system comprises an electronic business card delivery server and a mobile client which has established a communication link with the electronic business card delivery server;

the mobile client is used for: transmitting the present geographical location information, the name of mounted Bluetooth communication device, and a list of names of all the other Bluetooth communication devices detected by the Bluetooth communication device to the electronic business card delivery server; acquiring a user list of users corresponding to neighboring mobile clients located within a predetermined distance range and located within a detection range of the Bluetooth communication device from the electronic business card delivery server, and displaying the condensed identity information of users in the user list; selecting one or more users from the user list, as the object users of the electronic business card delivery, issuing an electronic business card delivery request for delivering the electronic business card to the object users and/or for acquiring the electronic business card from the object users, and transmitting the electronic business card delivery request to the electronic business card delivery server;

the electronic business card delivery server is used for: transmitting the electronic business card delivery request to the mobile client corresponding to the selected user, and upon receiving a confirmation information transmitted from the mobile clients corresponding to the object users, responding to the electronic business card delivery request so as to deliver the electronic business card of the requesting user to the mobile client corresponding to the object user and/or deliver the electronic business card of the object user to the mobile client corresponding to the requesting user.

8. The system for delivering an electronic business card according to claim 7, characterized in that, the mobile client comprises:

a positioning unit, for acquiring the present geographical location information;

a Bluetooth information providing unit, for providing the name of the mounted Bluetooth communication device, and a list of names of all the other Bluetooth communication devices detected by the Bluetooth communication device;

an information transmit-receive unit, for transmitting the present geographical location information, the name of the mounted Bluetooth communication device, the list of names of all the other Bluetooth communication devices detected by the Bluetooth communication device, the condensed identity information and/or the electronic business card to the electronic business card delivery server;

a display unit;

a selecting unit, for selecting one or more users from the user list displayed on the display unit and transmitted from the electronic business card delivery server, as the object users of the electronic business card delivery;

an electronic business card delivery request unit, for generating an electronic business card delivery request for delivering the electronic business card to the object users and/or for acquiring the electronic business card from the object users, for the object users selected by the selecting unit; the electronic business card delivery request being transmitted via the electronic business card delivery server to the mobile client corresponding to the selected user;

a request confirmation unit, for confirming the electronic business card delivery request transmitted from the mobile client corresponding to the requesting user, and transmitting the confirmation information to the electronic business card delivery server;

a storage unit, for storing the electronic business card of its own users and the electronic business card of the object user which is received via the information transmit-receive unit and is issued by the electronic business card delivery server in response to the confirmation information of the mobile client corresponding to the object user;

the electronic business card delivery server comprises:

an information transmit-receive unit, for receiving the present geographical location information, the name of the mounted Bluetooth communication device, the list of names of all the other Bluetooth communication devices detected by the Bluetooth communication device, condensed identity information and/or electronic business card, which are transmitted from respective mobile client; transmitting the received condensed identity information and/or electronic business card of users to respective mobile client; and transmitting the electronic business card delivery request transmitted from the mobile client corresponding to the requesting user, to the mobile client corresponding to the selected user; the electronic business card delivery request being for delivering the electronic business card to the object users and/or for acquiring the electronic business card from the object users;

a geographical location information confirmation unit, for after receiving the present geographical location information transmitted from the mobile client corresponding to the requesting user, analyzing the present geographical location information of the mobile client corresponding to the requesting user as well as the present geographical location information of the mobile client corresponding to other users, in order to determine whether or not distance between other users and the requesting user is within the predetermined distance range;

a Bluetooth information searching unit, for finding out users located within the detection range of the Bluetooth communication device from the name list, after receiving the name of the mounted Bluetooth communication device and the list of names of all the other Bluetooth communication devices detected by the Bluetooth communication device transmitted from the mobile client corresponding to the requesting user;

an identity information providing unit, for transmitting a list of users corresponding to the neighboring mobile clients which are confirmed by the geographical location information confirmation unit to be located within the predetermined distance range and confirmed by the Bluetooth information searching unit to be located within the detection range of the Bluetooth communication device, to the mobile client corresponding to the requesting user, and displaying the condensed identity information of users in the user list on the mobile client;

an electronic business card providing unit, for responding to the electronic business card delivery request after receiving the confirmation information transmitted from the mobile client corresponding to the object user, so as to transmit the electronic business card of the requesting user to the mobile client corresponding to the object user and/or transmitting the electronic business card of the object user to the mobile client corresponding to the requesting user by the information transmit-receive unit;

a database, for storing the present geographical location information, the name of the mounted Bluetooth communication device, the list of names of all the other Bluetooth communication devices detected by the Bluetooth communication device, the condensed identity information and/or the electronic business card of the user corresponding to respective mobile client, which are transmitted from respective mobile client.

9. The system for delivering an electronic business card according to claim 7, characterized in that, the electronic business card delivery server further comprises an updating unit, which is used for: updating the user list according to new present geographical location information submitted by the mobile client, changes of the present geographical location information submitted by the mobile client, changes of the condensed identity information submitted by user, changes of the name of the mounted Bluetooth communication device, and/or changes of the list of names of all the other Bluetooth communication devices detected by the Bluetooth communication device; sending the updated user list as well as the condensed identity information of users in the updated user list to the mobile client corresponding to the requesting user; and updating the information in the electronic business card of users.

10. The system for delivering an electronic business card according to claim 7, characterized in that, the condensed identity information is transmitted to the electronic business card delivery server together with the geographical location information, or the condensed identity information is prestored in the electronic business card delivery server.

11. A system for delivering an electronic business card according to claim 7, characterized in that, the electronic business card is transmitted to the electronic business card delivery server when the requesting user submits the electronic business card delivery request and when the object user confirms the electronic business card delivery request, or the electronic business card is prestored in the electronic business card delivery server by the requesting user and the object users.

* * * * *